(12) United States Patent
Baugher et al.

(10) Patent No.: US 8,731,047 B2
(45) Date of Patent: May 20, 2014

(54) MIXING OF VIDEO CONTENT

(75) Inventors: Mark J. Baugher, Portland, OR (US);
Michael Anthony Pereira, Milpitas, CA (US); Philip Clifford Jacobs, Windham, NH (US); Wen-Hsiung Chen, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 1181 days.

(21) Appl. No.: 12/039,534

(22) Filed: Feb. 28, 2008

(65) Prior Publication Data

US 2009/0219437 A1    Sep. 3, 2009

(51) Int. Cl.
*H04N 5/92*       (2006.01)
*H04N 21/2347*  (2011.01)
*H04N 21/235*    (2011.01)
*H04N 21/60*      (2011.01)
*H04N 21/80*      (2011.01)

(52) U.S. Cl.
USPC ................................................ 375/240.01

(58) Field of Classification Search
CPC ............. H04N 21/23424; H04N 21/2347; H04N 21/235; H04N 21/44016; H04N 21/60; H04N 21/80; H04N 21/812

USPC ................. 348/385.1, 461, 473; 725/36
See application file for complete search history.

(56) References Cited

U.S. PATENT DOCUMENTS

| | | | |
|---|---|---|---|
| 7,500,258 B1 * | 3/2009 | Eldering | 725/32 |
| 7,979,877 B2 * | 7/2011 | Huber et al. | 725/36 |
| 2002/0090198 A1 * | 7/2002 | Rosenberg et al. | 386/52 |
| 2006/0288363 A1 * | 12/2006 | Kunkel et al. | 725/34 |
| 2007/0101357 A1 * | 5/2007 | Duffield | 725/30 |
| 2007/0220545 A1 * | 9/2007 | Awano | 725/34 |
| 2008/0068500 A1 * | 3/2008 | Krause | 348/473 |
| 2008/0259209 A1 * | 10/2008 | Houlgate et al. | 348/461 |
| 2009/0225983 A1 * | 9/2009 | Reinoso et al. | 380/212 |

* cited by examiner

*Primary Examiner* — Tung Vo
*Assistant Examiner* — Obafemi Sosanya
(74) *Attorney, Agent, or Firm* — Schwegman Lundberg & Woessner, P.A.

(57) ABSTRACT

A method and apparatus for mixing first and second video content portions is described. The method may comprise overlapping at least one frame of a first content portion comprising multiple frames with at least one frame of a second content portion comprising multiple frames to produce a composite video content. At least one reference frame comprising a frame of the first or second content portion prior to the overlapping may be designated. The composite video content and the reference frame may then be transmitted, for example, to a client device. The client device may use the reference frame to at least reduce an effect of the overlapping.

27 Claims, 9 Drawing Sheets

MIXING OF VIDEO CONTENT

FIELD

The present disclosure relates to a method, system and apparatus to mix and separate video content.

BACKGROUND

Producers of content may offer digital video content without charging for access to the video content, if the product offering can be monetized through advertising. In certain circumstances, for example, where the video content is distributed through peer-to-peer networks via the Internet, monetary losses may occur if one party modifies the video content (e.g., removes advertisements) before forwarding the video content over the network to others.

In certain circumstances, producers of content may also want to discourage modification of the video content for various other reasons, including but not limited to inhibiting copyright infringement, maintaining the integrity of the content, or for artistic reasons.

BRIEF DESCRIPTION OF DRAWINGS

The present disclosure is illustrated by way of example, and not limitation, in the figures of the accompanying drawings, in which like references indicate similar elements and in which.

DESCRIPTION OF EXAMPLE EMBODIMENTS

In the following description, for purposes of explanation, numerous specific details are set forth in order to provide a thorough understanding of example embodiments. It will be evident, however, to one skilled in the art that the present disclosure may be practiced without these specific details.

Overview

A method and apparatus for mixing first and second content portions is described. The method may comprise overlapping at least one frame of a first content portion comprising multiple frames with at least one frame of a second content portion comprising multiple frames to produce a composite video content. At least one reference frame comprising a frame of the first or second content portion prior to the overlapping may be designated. The composite video content and the reference frame may be transmitted, for example, to a client device. The client device may use the reference frame to at least reduce an effect of the overlapping.

Further, a method and apparatus is described for separating first and second content portions. The method may comprise receiving composite video content including first and second content portions, wherein at least one frame of the first content portion is overlapped with at least one frame of the second content portion. A client device may further receive at least one reference frame of the first or second content portion prior to the overlapping. The at least one overlapping frame in the composite video content may be processed utilizing the reference frame to at least reduce the effect of the overlapping. In an example embodiment, overlapping the frames may distort viewing of first content portion and the second content portion around an insertion point. Distortion may occur in an original frame (which may be from the first content portion or the second content portion). For example, luminance and chrominance may be modified by a mixing function across the overlapped frames. In an example embodiment, reducing the effect of overlapping the frames may include restoring the luminance and chrominance of the first content portion and the second content portion.

Example Embodiments

Figure 1:
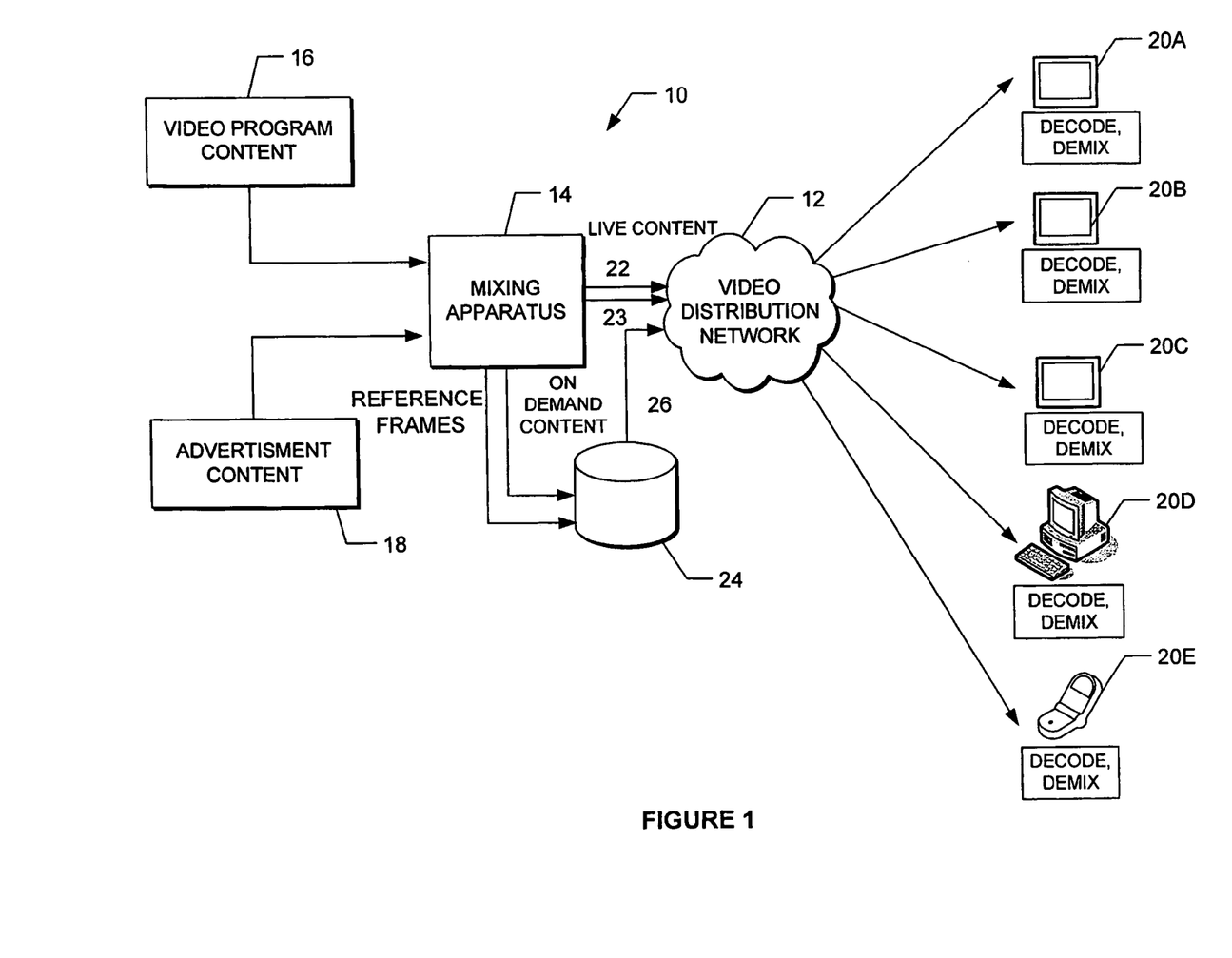
FIG. 1 shows a block diagram of a system, in accordance with an example embodiment, to mix and separate video content.

Referring to FIG. 1, reference numeral 10 generally indicates a system, in accordance with an example embodiment, to mix, transmit and separate video content via a video distribution network 12.

In the example system 10, a first content portion (e.g., audio/visual video program content 16) may be sourced from a content producer, while a second content portion (e.g., audio/visual advertisement content 18) may be sourced from an advertising agency or an advertiser. Mixing apparatus 14 is configured to mix the first and second content portions so that video frames in the first content portion overlap with video frames in the second content portion. As described in more detail herein, reference frames may be utilized at a client device to remove the effect introduced by the mixing. It should however be noted that the system 10 may be utilized to mix and separate any content streams and is not limited to mixing advertisements into program content. In an example embodiment, the first and second content portions are stored in memory and accessed to perform any one or more of the methodologies described herein.

In the example system 10 of FIG. 1, the mixing apparatus 14 receives (or accesses) the video program content 16, the advertisement content 18, and mixing parameters identifying how the content portions should be mixed. Based on the mixing parameters, frames of the video program content 16 and frames of the advertisement content 18 are overlapped, and then encoded to provide encoded composite content. The encoded composite content is then communicated over the video distribution network 12 to example client devices 20A to 20E. Reference frames comprising frames of the first or second content portion prior to the overlapping are designated and also communicated (e.g., out-of-band) to one or more of the client devices 20A to 20E. In addition, a mixing function used to mix the frames may be communicated to the example client devices 20A to 20E. The client devices 20A to 20E process the composite video content utilizing the reference frames and the mixing function to at least reduce (or eliminate) the effect of the overlapping.

In one example embodiment, the composite content may be transmitted as live content (see arrow 22) over the video distribution network 12, for example as live broadcast programming. In addition or instead, the composite content may be stored in a data store 24 and may then be distributed at a later stage, for example, on demand (see arrow 26). On demand programming may include pay-per-view (PPV) programming, video-on-demand (VoD), distributed peer-to-peer viewing, or the like. Thus, the live content may be transmitted, with advertising overlapped, on-the-fly, as it is being distributed to viewers. In contrast, content distributed at a later stage may be prepared and then stored. The reference frames may be communicated directly to the video distribution network (see arrow 23) or stored in the data store 24 for subsequent distribution.

In an example embodiment, the video distribution network 12 may be a cable network, for example, an HFC (Hybrid Fiber Cable) network, a telecommunications network, e.g., a DSL (Digital Subscriber Line) network, FTTX (Fiber to the X) network, or any other network. For example, a cable network may distribute the encoded composite video content to the plurality of client devices 20A to 20C. The client devices 20A to 20C may be Set-Top-Boxes (STBs) coupled to a television set. In addition or instead, encoded composite video content may be communicated to a personal/laptop computer 20D. In another example embodiment, the video distribution network 12 may include a cellular communications network to distribute the composite content to one or more mobile devices 20E. It should be noted that client devices 20A-20C may include DVR (Digital Video Recorder) or PVR (Personal Video Recorder) functionality. In an example embodiment, the composite video is communicated to a media gateway within a home.

As will be described by way of example in more detail below, metadata may be transmitted from the mixing apparatus 14 to the client devices 20A to 20E to enable the client devices 20A to 20E to decompress, separate (or de-mix) and decode the composite content to substantially remove the effect of the overlapping.

Figure 2:
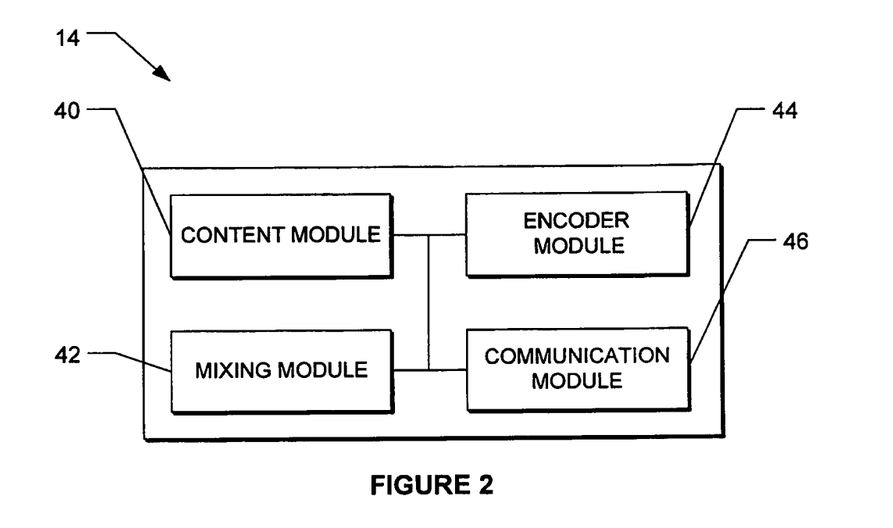
FIG. 2 shows a block diagram of mixing apparatus, in accordance with an example embodiment, which may form part of the system of FIG. 1.

Referring to FIG. 2, example details of the apparatus 14 for mixing the first and second content portions is shown. The mixing apparatus 14 may in an example embodiment form part of a cable headend, or may be located in a studio where the first and second content portions (e.g., the video program content 16 and the advertisement content 18) are mixed. It will be appreciated that the mixing apparatus 14 may be deployed at any location where video content portions are mixed (e.g., secondary content is inserted or spliced into primary content).

Figure 4A:
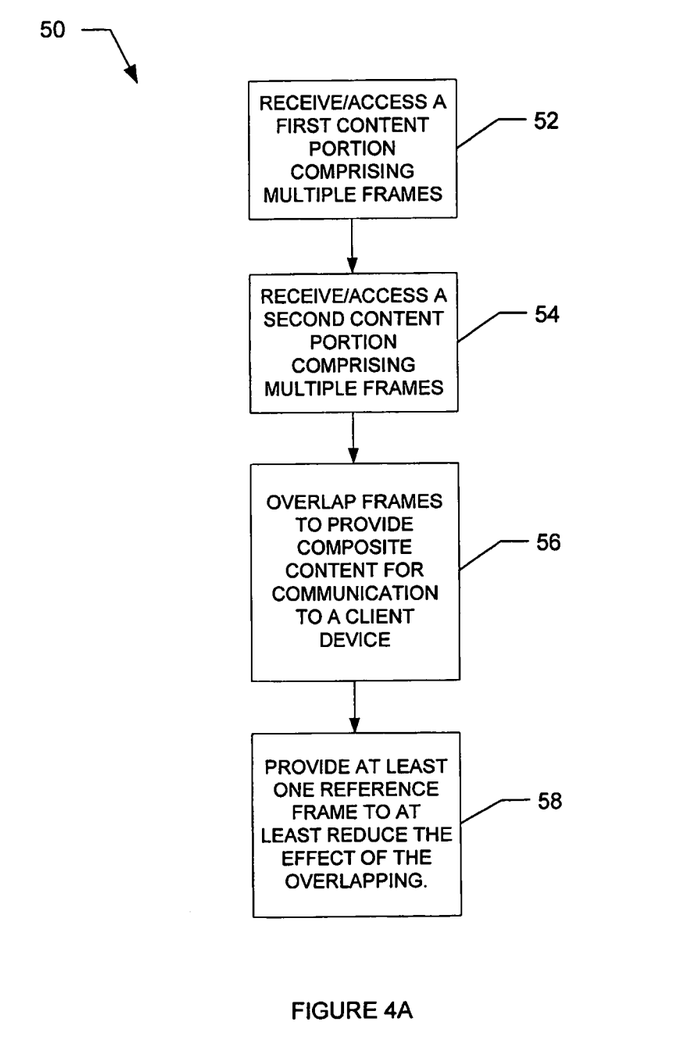
FIG. 4A shows a schematic flow diagram of a method, in accordance with an example embodiment, for mixing first and second content portions.

In the example embodiment shown in FIG. 2, the mixing apparatus 14 is shown to include a content module 40, a mixing module 42, an encoder module 44 and a communication module 46. FIG. 4A shows an example embodiment of a method 50, in accordance with an example embodiment, for mixing first and second portions of video content. The method 50 may be performed by the mixing apparatus 14 and, accordingly, is described by way of example with reference thereto.

Referring to FIGS. 2 and 4A, the content module 40 may identify (and/or receive) the first and second content portions which are to be mixed (see blocks 52 and 54 in FIG. 4A). The first and second content portions may comprise multiple video frames. As mentioned above, the first content portion may be primary content, such as video programming content, while the second content portion may be secondary content, such as advertising material in the form of commercials. Each of the content portions may comprise multiple frames which, when displayed, form a moving picture that is viewed as video content.

Mixing parameters (e.g., defined by metadata) may stipulate how the second content portion should be overlapped or mixed with the first content portion. For example, an agreement between various parties in the video distribution network 12 may stipulate the type of advertisement, whether it is an interstitial or pre- or post-roll advertisement, information on a mixing or composition function that is to be used to mix or overlap the second content portion with the first content portion, information on the specified length of disruption resulting from the overlap, or the like.

As shown at block 56, the mixing module 42 may overlap at least one frame of the second content portion with at least one frame of the first content portion to generate composite content. The composite content may then be encoded prior to distributing it via the video distribution network 12 (see the encoder module 44). The overlap of the first and second content portions may be dependent upon mixing parameters (e.g., predefined mixing parameters). In an example embodiment, reference frames may then be communicated to one or more client devices (e.g., the client devices 20A-20E) via the communication module 46 to subsequently extract the first and second content portions from the composite content portions. The reference frames may be provided to at least reduce the effect of the overlapping (see block 58).

The mixing parameters may define or regulate the manner in which the first and second content portions are mixed. For example, when the second content portion is an advertisement, the mixing parameters may dictate if the advertisement is to be inserted into a video program in a pre-roll or a post-roll manner. In an example embodiment, the mixing parameters may provide that the advertisement is to be inserted as an interstitial advertisement, and may provide an insertion point of the advertisement in the video program. Thus, in an example embodiment, the mixing parameters may be provided to the mixing module 42 to control insertion of the advertisement. In an example embodiment, secondary content may be "cut and spliced" into primary content wherein frames of the secondary content overlap with frames of the primary content at the point of insertion.

The mixing parameters may define a number of frames (or time duration) during which the first and second content portions are to overlap. The duration of the overlap may be dependent upon an acceptable level of disruption or distortion of playback of the composite video content. For example, if a content producer specifies a time duration of the overlap, the mixing module 42 may calculate a number frames of the first content portion and the second content portion that are to be overlapped. In an example embodiment, the mixing module 42, together with the encoder module 44, may determine the placement of I-frames in the sequence of frames leading up to any overlap. The term "reference frames" includes frames in the pixel domain or reference I-frames in an encoded domain.

In an example embodiment, a mixing function may be provided to overlap the frames of the first and second content portions. The mixing function may, for example, comprise a simple overlay of the first and second content portions. In an example embodiment, an intelligent mixing function may be utilized that takes into account video objects and their potential conflict with other objects being inserted. In an example embodiment, a gradual fading-in or fading-out of the first and second content portions may be performed. Methods such as spliced content fade-in or fade-out may also be used.

The mixing function may have many variations from one example embodiment to another. For example, the mixing function ($f_{MIX}$) may include:

- Simple weighting, e.g., $f_{MIX}$=(first content portion×Weight$_A$)+(second content portion×Weight$_B$)
- Progressive weighting
- Fades or wipes. For example, the first content portion may fade-in or -out over time; the second content portion may fade in or out over time;
- Sequential second content, for example, back-to-back advertisement content with $f_{MIX}$ that varies for each of the advertisements
- Object detection and avoidance in the first content portion, for example, program content
- Object detection and avoidance in the second content portion (for example, advertisement content)
- Audio suppression
- Audio compositing (fade-out/fade-in)

In an example embodiment the first and second content portions may buffer frames adjacent to the insertion or splicing point. In an example embodiment, a relatively large buffer size may be provided to facilitate encoding the frames immediately before and after the insertion point. Example encoding formats include MPEG2, MPEG4 Part 10 (AVC), Windows Media VC-1 or the like.

In an example embodiment, three frame types may be used in video compression, namely I-frames, P-frames and B-frames. I-frames may contain the most data, are the largest and incur the heaviest burden on bandwidth as they are coded without any reference to adjacent frames. For video with high amounts of motion, more I-frames need to form part of a video stream in order to maintain a high quality picture. P-frames and B-frames are dependent on inter-frame compression. For example, B-frames and P-frames may contain both image data and motion vector displacements and combinations of the two. B-frames and P-frames require the prior decoding of other frames before being decoded themselves. B-frames may further include prediction modes that form a prediction of a motion region. These characteristics may be utilized in controlling the effect the mixing has on the composite video transmitted to the client devices.

For example, the encoder module 44 may determine where to place the previous I-frame and this may occur prior to overlapping the first and second content portions. The possibility exists that the next I-frame may be placed in the overlapping portion of frames. The longer the period of overlap (and hence distortion of played back video) the greater the likelihood that the I-frame will occur in the overlapping portion.

In another example embodiment, the encoder module 44 may further, prior to the point of frame overlap, increase the group of picture (GOP) size of the encoded first and second content portions thereby to increase a number of predicted P- or B-frames during the frame overlap. This may also result in a longer period of distortion during played back of the video, should the second content portion be removed (e.g., cut) from the composite content without utilizing the reference frames as described herein.

In an example embodiment, the communication module 46 may transmit the composite content to the plurality client devices 20A to 20E (which may include one or more STBs) over the video distribution network 12 of FIG. 1. The communication module 46 may further transmit the designated reference frames of the first or second content portion to the client device 20A to 20E. These reference frames may be used at the client device 20A to 20E to extract and separate the first and second content portions from the composite content, after decoding of the composite content.

In another example embodiment, the communication module 46 may transmit metadata to the client devices 20A to 20E. The metadata may include the mixing function (e.g., including mixing parameters) used to overlap the frames of the first and second content portions. Other information may also be included in the metadata, for example, a "fixup" function that may be used to align timestamps and enable separate viewing of the first and second content portions at the client device 20A to 20E (e.g., picture-in-picture viewing). The metadata may further include other data relating to timing and synchronization of the first and second content portions. In an example embodiment, metadata may only be transmitted directly to the client devices 20A to 20E in instances of live broadcast programming.

In an example embodiment, the encoded or unencoded frames that overlap and the metadata may be transmitted out-of-band to the client device 20A to 20E via a separate channel (e.g., a signaling channel) or the like.

In an example embodiment, the communication module 46 may provide the above information to the data store 24 for storage until later transmission of this data to the example client devices 20A to 20E over the video distribution network 14. The data store 24 may be used where video content is transmitted on demand, for example, for pay-per-view, video on demand or distributed peer-to-peer viewing. File formats such as Apple QuickTime™ and the MPEG-4 file format may be used to store video content together with timing, synchronization and other metadata that are organized into tracks and used during playback of the content. In these instances of content download, the metadata may be included in a file with media using an MPEG-4 or Quicktime file structure.

Figure 3:
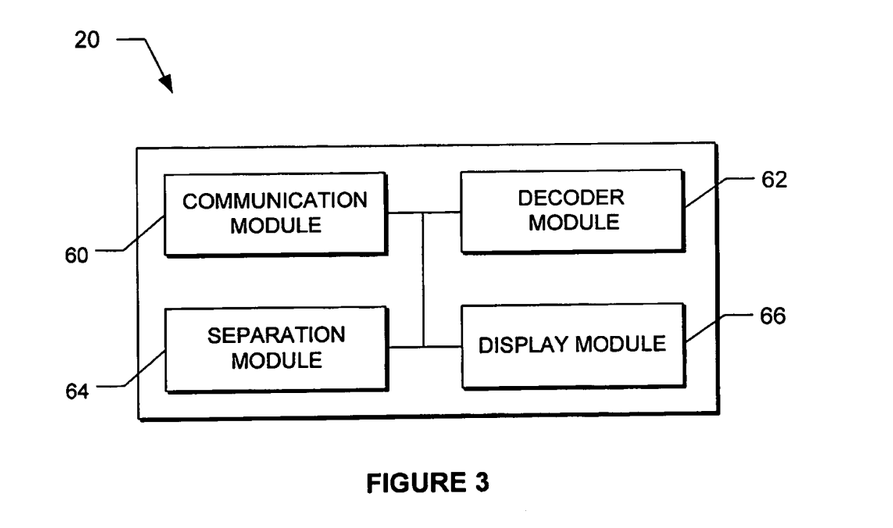
FIG. 3 shows a block diagram of a client device, in accordance with an example embodiment, which may form part of the system of FIG. 1.
Figure 4B:
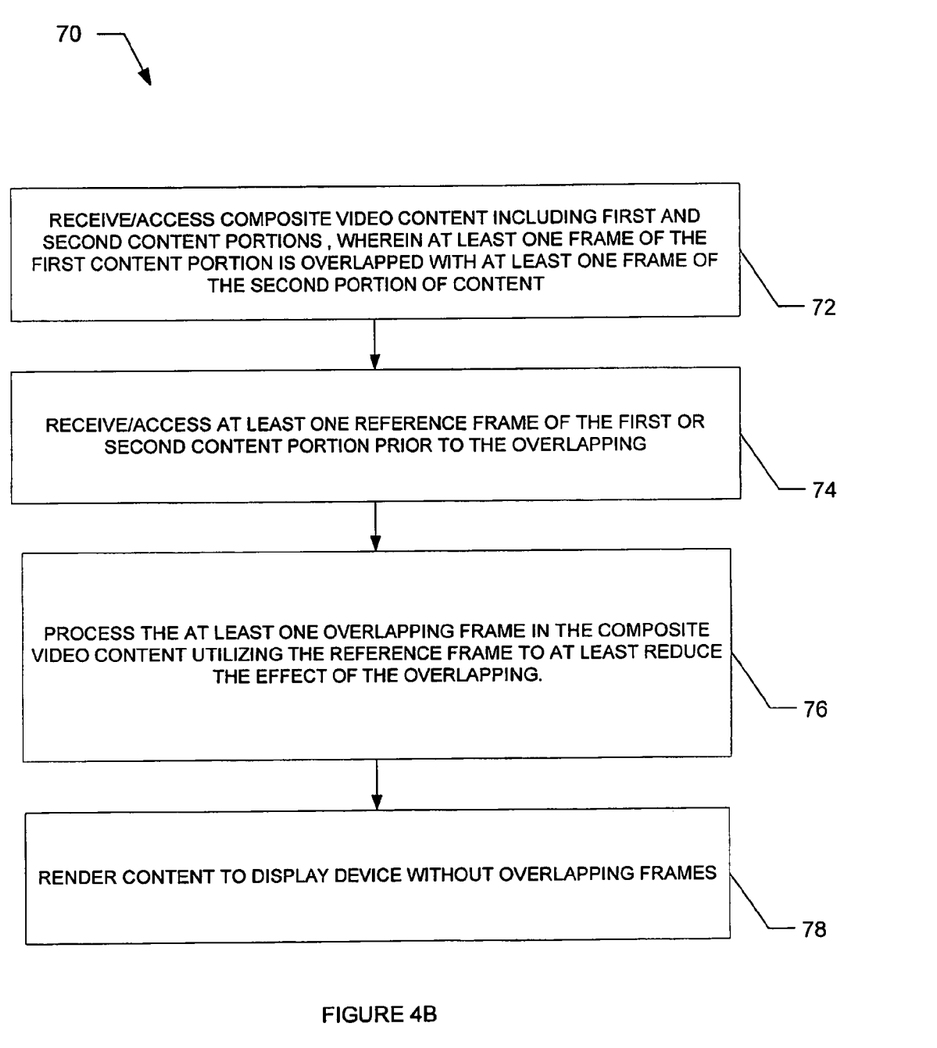
FIG. 4B shows a schematic flow diagram of a method, in accordance with an example embodiment, for separating first and second content portions.

Referring to FIG. 3, example details of a client device 20 are shown. For the sake of clarity, only modules that may relate to the present disclosure are shown in FIG. 3. In an example embodiment, the client device 20 includes STB functionality and may be a standalone STB connected to a television set. The example client device 20 is shown to comprise a communication module 60, a decoder module 62, a separation module 64 and a display module 66. FIG. 4B shows an example embodiment of a method 70, in accordance with an example embodiment, for separating first and second content portions from composite video content. The method 70 may be performed by the client device 20 and, accordingly, is described by way of example with reference thereto.

Referring to FIGS. 3 and 4B, the communication module 60 may receive encoded composite content via a content distribution network (e.g., the video distribution network 12) as shown in block 72. As mentioned above, the encoded composite content may comprise first and second content portions wherein at least one frame of the first content portion is overlapped with at least one frame of the second content portion.

The communication module 60 may further receive at least one designated reference frame (e.g., from the mixing apparatus 14) in order to at least reduce the effect or distortion introduced into the composite content by the overlapping of frames. These references frames may be encoded or unencoded. As mentioned above, the reference frames may be the frames of the first content portion or the second content portion prior to performing the overlapping functionality (see block 74).

In an example embodiment, the reference frames are utilized by the separation module 64 to extract and separate the first and second content portions from the composite content and thus remove the distortion introduced by the mixing or overlapping of frames. In an example embodiment, the communication module 60 may further receive metadata including the mixing function (or mixing parameters) used by the mixing module 42 to overlap the frames of the first and second content portions. Other information required for separating or de-mixing may also be included in the metadata. Both the reference frames and the metadata may be received out-of-band by the communication module 60. It is to be appreciated that, if desired, the composite content including the overlapped first and second content portions can be displayed on a display device.

In an example embodiment, the reference frames and the metadata may be received from the data store 24 as part of a particular file structure, e.g., an MPEG-4 or QuickTime file structure. The decoder module 62 may decode the encoded composite content. Further, when the reference frames are encoded, the decoder module 62 may then decode the reference frames for use in removing the effect of overlapping the frames.

The separation module 64 may obtain the mixing function (or an inverse of the mixing function), which may form part of the metadata received by the communication module 62. Utilizing an inverse of the mixing function, the separation module 64 may process the decoded composite content with the reference frames in order to extract and separate the first and second content portions from the composite content (see block 76).

In an example embodiment, the display module 66 may drive a display device or screen to display the modified composite content in which the effect of the overlapping has been removed (see block 78). Thus, when the video content is displayed, viewing of the two content portions is sequential without any overlapping in frames. In an example embodiment, the separated and extracted first and second content portions may be displayed separately. For example, when the display device is a television set, the second content portion may be displayed as separate content in a picture-in-picture format.

Figure 5:
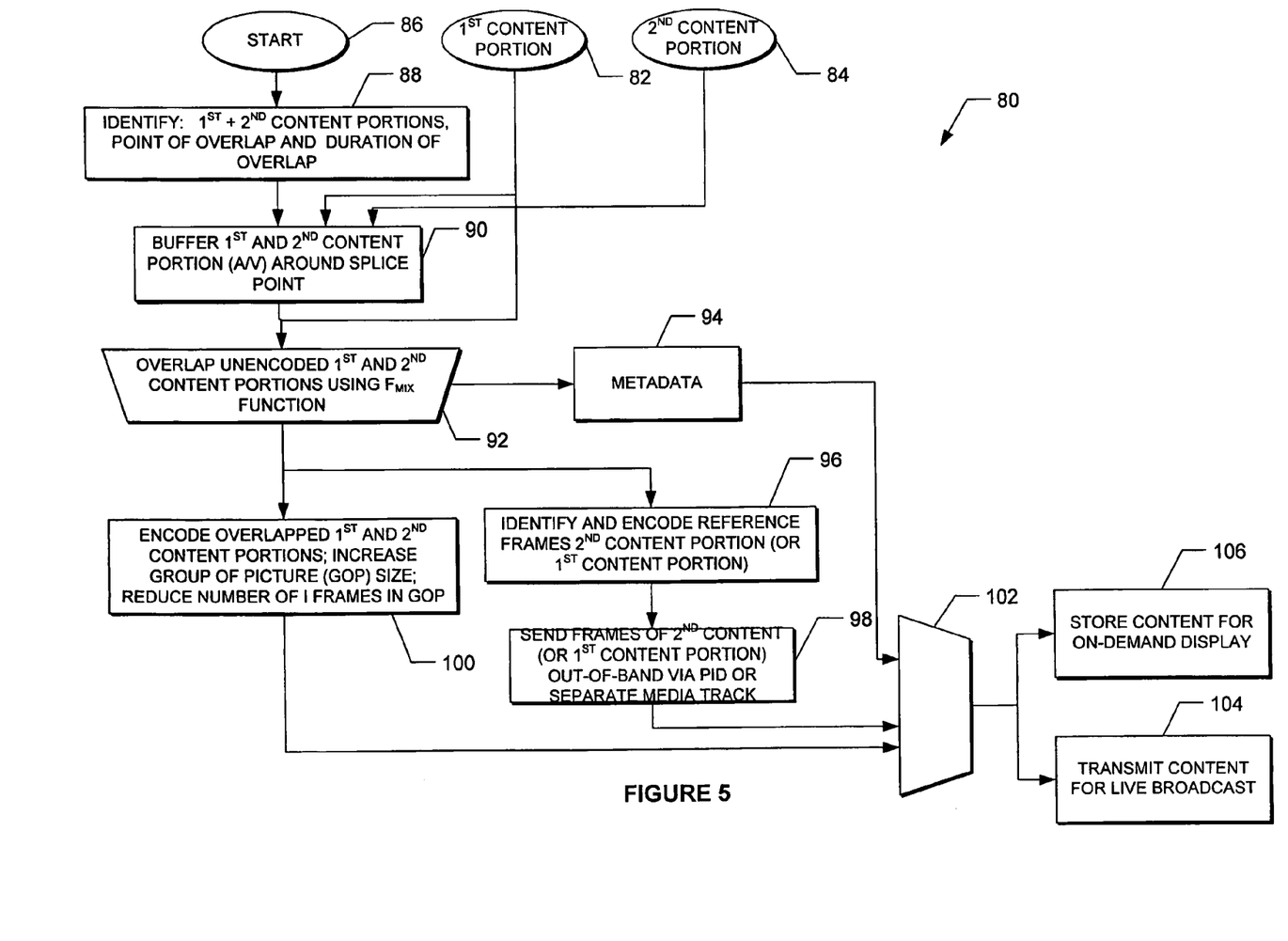
FIG. 5 shows a schematic diagram of a method, in accordance with an example embodiment, for mixing and encoding a first content portion with a second content portion.

Turning now to FIG. 5, a schematic diagram of a further example method 80 for mixing and encoding a first content portion 82 with a second content portion 84. The method 80 may utilize the mixing apparatus 14 of FIGS. 1 and 2 and, accordingly, is described by way of example with reference thereto.

The method 80 is shown to start at block 86 whereafter, and as shown at block 88, the method 80 identifies the first content portion 82 and the second content portion 84 to be mixed. In an example embodiment, the content module 40 (see FIG. 2) of the mixing apparatus 14 may perform the identification based on user input. For example, mixing parameters, synchronization points, and other information that may be used to control and parameterize overlapping and encoding may be provided at block 88. The mixing parameters may be provided to define the manner in which the first and second content portions 82, 84 are to be mixed. Example mixing parameters include identification of an insertion point in the first content portion 82 at which the second content portion 84 is to be inserted.

Thereafter, as shown at block 90, the first and second content portions 82, 84 may be sourced, for example, retrieved from a content database. In an example embodiment, as shown at block 90, the first and second content portions 82, 84. A sufficiently large buffer may be provided for encoding and compressing the frames immediately before and after the point at which the second content portion 84 is inserted or spliced into the first content portion 82.

As shown at block 92, the method 80 may cause one or more frames of the second content portion 84 to be overlapped with one or more frames of the first content portion 82 at the insertion point. For example, frames in the first content portion 82 (e.g., primary content) adjacent the insertion point may then be overlapped with beginning and end portions of the second content portion 84 (e.g., secondary content) as described in more detail below with reference to FIG. 6. It is to be noted that, in an example embodiment, the overlapping or mixing is performed prior to encoding the first and second content portions 82, 84.

Returning to block 92, in an example embodiment, a mixing function ($f_{MIX}$) may be used to overlap one or more frames of the first and second content portions 82, 84. It should be noted that the mixing function may be any suitable function to mix video content. For example, the mixing function may be a simple weighting function, a progressive weighting function, a fade-in or fade-out function or the like as mentioned above.

During mixing of the first and second content portions 82, 84, metadata may be generated (e.g., by the mixing module 42). For example, the metadata may comprise an identifier to identify the $f_{MIX}$ function which is to be communicated with the composite content (see block 94) to a client device. The metadata is then used by the client device during separating or de-mixing to reverse video effect introduced by the overlapping.

Frames of the first content portion 82 or the frames of the second content portion 84 subject to overlapping, but prior to performing any overlapping, are then encoded to provide reference frames that are used to reverse the effects introduced into the video as a result of the overlapping (see block 96). Accordingly, as shown at block 104, these reference frames are then also transmitted to a client device (e.g., a STB, PC, or the like). In the example system 10 of FIG. 1, the reference frames are transmitted to the client device 20A to 20E (see block 98). The reference frames may, in addition or instead, be stored in a data store, e.g., data store 24, for delayed transmission to client devices (e.g., on-demand). In an example embodiment, the communication of the reference frames is out-of-band, via a separate PID (PID=Program ID or Program Identifier), or via a separate media track. The reference frames may, for example, be communicated in any manner that inhibits unauthorized circumvention of the effect of the mixing function.

As mentioned above, the reference frames that are transmitted to the client devices (e.g., the client devices 20A to 20E) may be obtained from the first content portion 82 proximate the insertion point, or from beginning and end portions of the second content portion 84 to be inserted into the first content portion 82.

Returning to block 92, once the first and second content portions 82, 84 have been overlapped, the composite content may be encoded (see block 100). The frames may be encoded employing any one of various encoding formats, for example MPEG2, MPEG4 Part 10 (AVC), Windows Media VC-1 or the like. In an example embodiment, the encoder module 44 (see FIG. 2) may increase the group of picture (GOP) size before to the inception of any frame overlap between the first and second content portions 82, 84. In an example embodiment, the number of I-frames may be reduced. This may be done in order to increase a number of predicted P- or B-frames during the frame overlap, thereby to increase the period that may be influenced should the second content portion be removed from the encoded composite content.

As shown at block 102, the encoded composite content, the encoded reference frames, and the metadata may processed to be transmitted over a video distribution network to the client devices as part of a live broadcast stream (see block 104). In addition or instead, the processed content may be stored in a data store (see block 106), for later transmission over a video distribution network.

Figure 6:
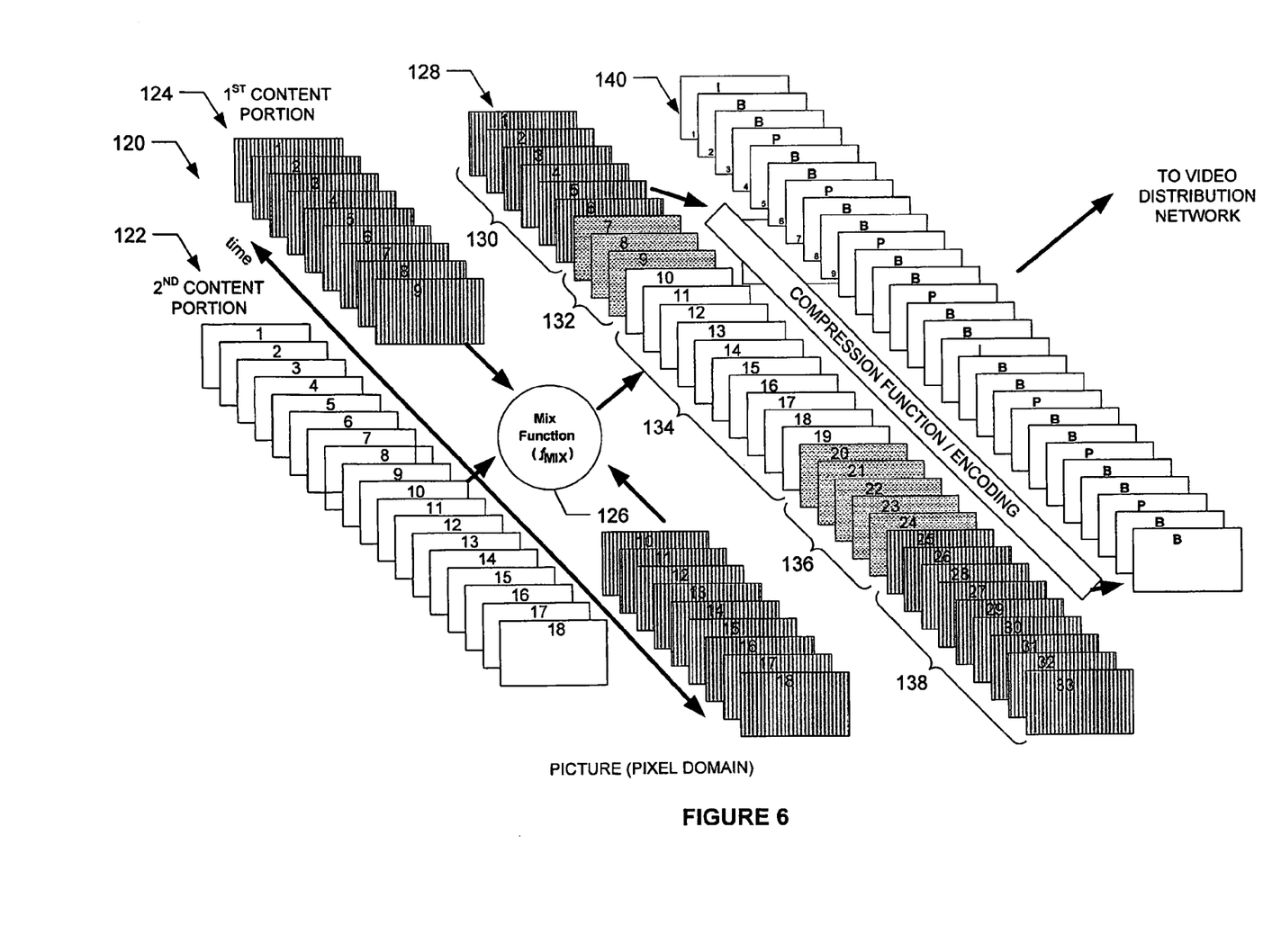
FIG. 6 shows a graphical representation in the pixel domain of frames of a first content portion being mixed and encoded with frames of a second content portion, in accordance with an example embodiment.

FIG. 6 shows an example of a graphical representation in the pixel domain of the method 80 of mixing a first content portion 124 with frames of a second content portion 122 to provide encoded composite content 140. The second content portion 122 may be advertisement content that is to be inserted into the first content portion 124. The first content portion 124 may be program content such as video content into which one or more interstitial commercials are to be inserted. Both the first and second content portions 124, 122 comprise multiple frames of which some of the multiple frames are overlapped as herein described (e.g., using a mixing function 126). The result of the mixing process is composite content 128 (unencoded) comprising a single set of multiple frames which may be subdivided into a leading first content portion 130, leading composite frames of the overlapped first and second content portions 132 (at the beginning of the second content portion), multiple frames of the second content portion 134, trailing composite frames of the overlapped first and second content portions 136 (at the end of the second content portion), with the final frames relating only to a trailing first content portion 138. In this example embodiment, three leading composite frames are shown that define the overlapped first and second content portions 132, while five frames are shown to define the trailing composite frames of the overlapped first and second content portions 136.

This composite content 128 may be encoded by the encoder module 44 of the mixing apparatus 14 into multiple groups of pictures (GOP), which comprise various I-, B- and P-frames. As the second content portion 122 is overlapped and embedded in the first content portion 124, removal of the overlapped content portions 132 and 136 from the composite content would delete a portion of the first content portion 124 (and the second content portion 122) thus affecting the display of the first content portion 124. Thus, for example, if the second content portion 122 is an advertisement inserted into a video (provided by the first content portion 122), removal of the advertisement will remove portions of the video and if the size of the GOP is increased around the area of insertion, the disruption to the original may be even more enhanced, Turning to FIG. 7, a schematic diagram of a method 160, in accordance with an example embodiment, for separating and decoding composite content provided by the method 80 is shown. In an example embodiment, the method 160 may be performed by one or more of the client devices 20A to 20E and, accordingly, is described by way of example with reference thereto.

In the method 160, stored composite content 162 and/or composite content from a live broadcast 164 may be received at a client device 20A to 20E as shown in FIG. 2. As shown at block 166, the received metadata 168, the received reference frames 170, and the received composite content 172 are then derived from the received composite content (see block 166). In the example client device 20 of FIG. 3, the separation module 64 may extract the metadata 168, the reference frames 170 and the composite content 172. As mentioned above, the metadata 168 may comprise a mixing function that was used to mix or overlap frames of the first content portion 82 with frames of the second content portion 84 (see FIG. 5). The reference frames 170 may comprise either the frames of the first portion or second content portion prior to overlapping or mixing with other frames.

Figure 7:
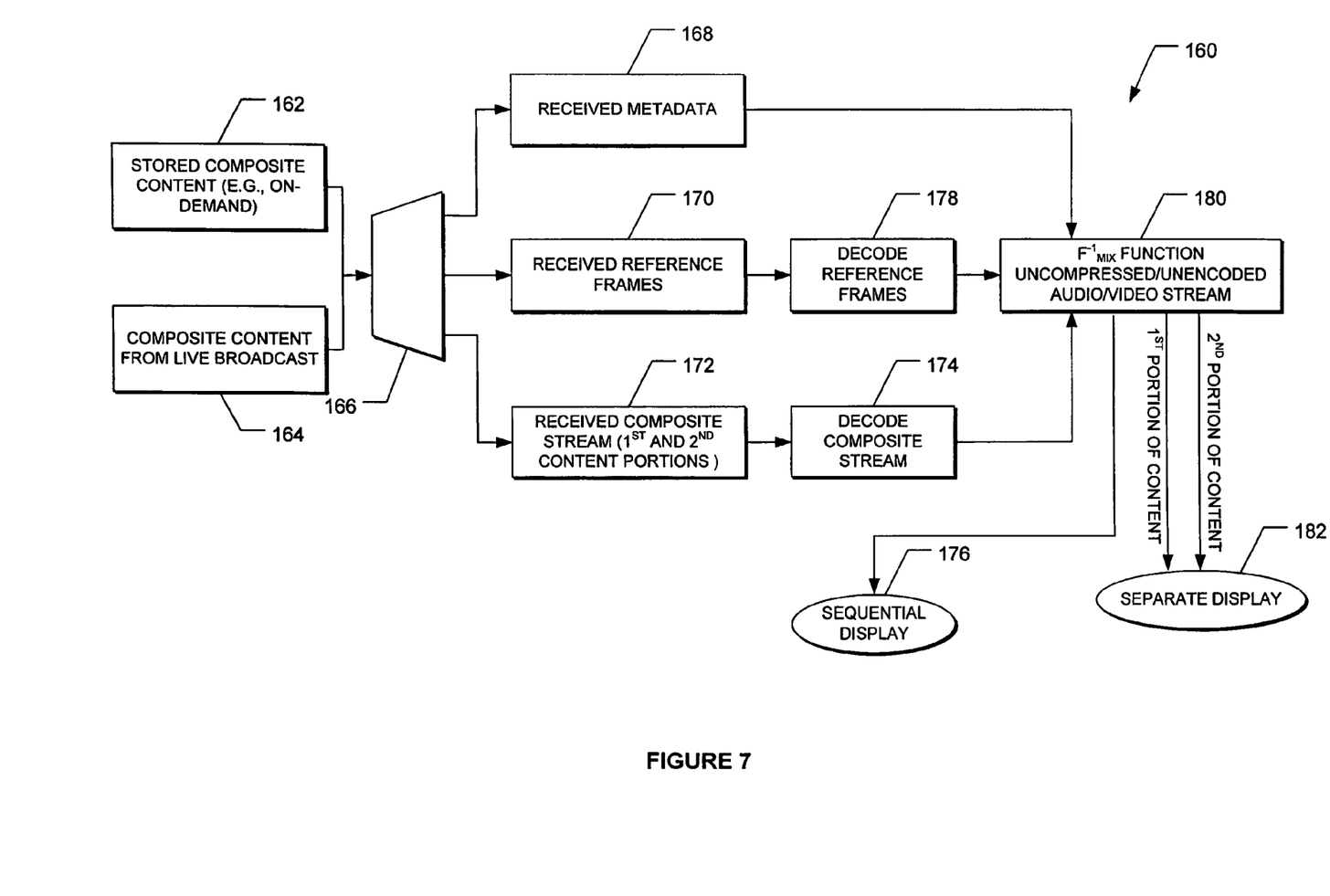
FIG. 7 shows a schematic flow diagram of method, in accordance with an example embodiment, for separating and decoding composite content comprising first and second content portions.

In an example embodiment, the composite content is decoded, e.g., from a format comprising I-, P- and B-frames, to produce unencoded composite content comprising multiple frames (see block 174). The decoded reference frames may then be used (e.g., by the separation module 64) in conjunction with the decoded composite content, to extract and separate the first and second content portions from the composite content (see block 180). In an example embodiment, this extraction and separation process employs an inverse of the mixing function identified (or provided) by the metadata (see block 168). A secondary function, e.g., a "fixup" function, may also be included in the received metadata 168. The fixup function may be used to align timestamps of the first content portion 82 and the second content portion 84. The method 160 may then provide the first content portion 82 and the second content portion 84 as separate video streams to a viewing screen (e.g., a television set or PC monitor) as shown at 182. In addition or instead, the first and second content portions 82, 84 may be displayed as composite-content wherein the first and second portions 82, 84 are displayed sequentially as shown at 176.

Figure 8:
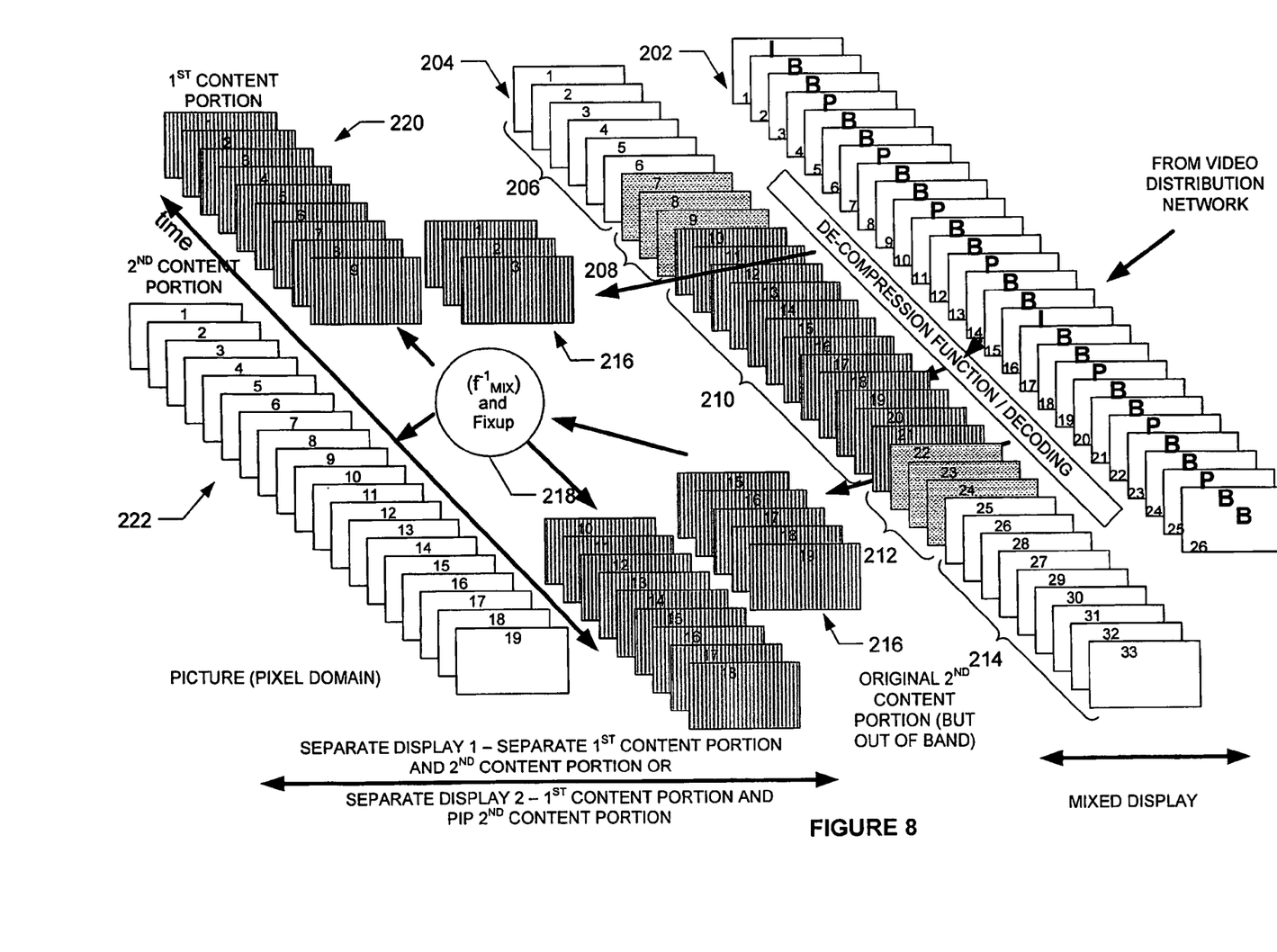
FIG. 8 shows a graphical representation of mixed and encoded frames of composite content being separated and decoded, in accordance with an example embodiment.

FIG. 8 shows an example of a graphical representation in the pixel domain of the method 160 to separate first and second content portions 220, 222 from encoded composite content 202. The encoded composite content may correspond to the encoded composite content 140 of FIG. 6. The composite content 202 may received by one or more of the client devices 20A to 20E of FIG. 1. In an example embodiment, the composite content 202 is decoded for decompression into decoded composite content 204. The decoded composite content 204 is shown to comprise a single set of multiple frames which may be subdivided into a leading first content portion 206, leading composite frames of the overlapped first and second content portions 208 (at the beginning of the second content portion), multiple frames of the second content portion 210, trailing composite frames of the overlapped first and second content portions 212 (at the end of the second content portion), with the final frames relating only to a trailing first content portion 214. The leading first content portion 206 corresponds to the leading first content portion 130, the leading composite frames of the overlapped first and second content portions 208 correspond to the leading composite frames of the overlapped first and second content portions 132, the multiple frames of the second content portion 210 correspond to the multiple frames of the second content portion 134, the trailing composite frames of the overlapped first and second content portions 212 correspond to the trailing composite frames of the overlapped first and second content portions 136, and the final frames relating only to a trailing first content portion 214 correspond to the trailing first content portion 138.

As described above, encoded reference frames that have been received by the client device 20A to 20E may be decoded (see reference numeral 216) and may be used in conjunction with the decoded composite content 204 to remove the effect of the overlapping. For example, an inverse of the mixing function and optionally, a fixup function (see reference numeral 218), may be used to extract and separate the first content portion 220 and the second content portion 222 from the composite content 204.

In an example embodiment, the display module 66 of the client device 20 of FIG. 3 may either display sequential composite content (comprising the second content portion embedded in the first content portion without any overlap), or may display the first and second content portions 220 and 222 separately in parallel (e.g., in a picture-in-picture manner). When the content is displayed as sequential composite content, the first content portion is displayed until an insertion point, followed by the second content portion without any overlapping frames, followed by a remaining portion of the first content portion. Thus, the frames may be displayed to a user without any mixing. The composite content can also be displayed in an unprocessed form on a display device where the frames are presented in their overlapping state.

In an example embodiment, advertisement content is mixed with program content. By mixing or integrating the advertisement content and the program content, the unauthorized removal of the advertisement may be inhibited. In an example embodiment, the removal of the advertisement may result in a degradation and loss of quality of the program content. In an example embodiment, removal of the advertisement may result in a portion of the program content not being viewable for a pre-defined period of time before and after the advertisement. Example embodiments may thus at least inhibit the removal of advertisements in program content.

In other example embodiments, by overlapping portions of content, the editing out of content portions in a movie, which may occur during unauthorized censorship procedures, may be inhibited.

The mixing parameters may relate to a buy and/or sell agreement that is negotiated between a content producer and a secondary party. Thus, the agreement may stipulate information on how the second content portion should be overlapped or mixed with the first content portion. In circumstances where the second content portion relates to advertisement content, the agreement between the content producer and the advertiser may stipulate the type of advertisement, for example, whether the advertisement should be placed as an interstitial advertisement which is to be embedded in the first content portion or whether the advertisement is to be placed as a pre- or post-roll advertisement that is to be embedded prior to or after the first portion or content. In one example embodiment, the agreement may further include information on a mixing function that is to be used to mix or overlap the second content portion with the first content portion. The agreement may further specify information on the proposed length of the overlap as well as audio characteristics during the mixing process.

Figure 9:
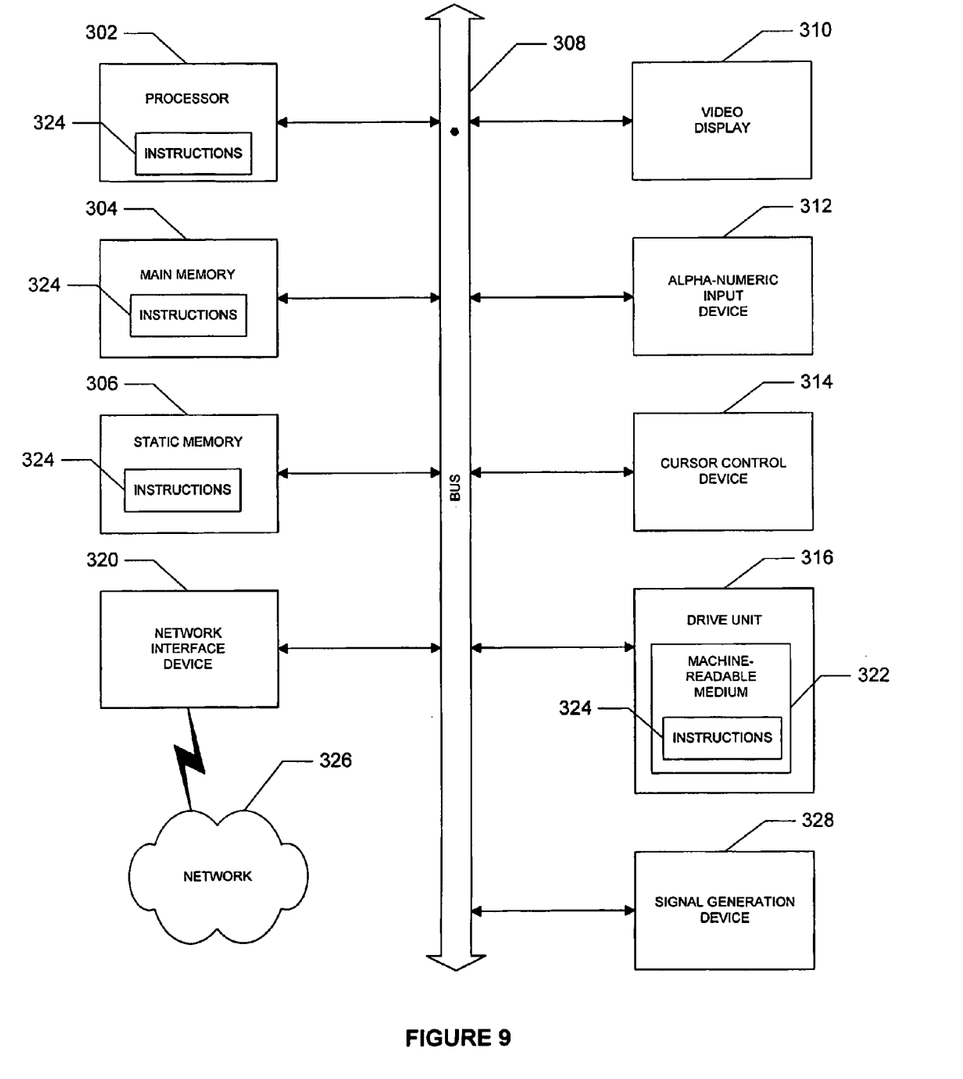
FIG. 9 shows a diagrammatic representation of machine in the example form of a computer system within which a set of instructions, for causing the machine to perform any one or more of the methodologies discussed herein, may be executed.

FIG. 9 shows a diagrammatic representation of machine in the example form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 includes a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions and data structures (e.g., software 324) embodying or utilized by any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320 utilizing any one of a number of well-known transfer protocols (e.g., HTTP).

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment of the present disclosure has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

What is claimed is:

1. A method comprising:
designating at least one reference flame comprising a flame of a first or second content portion capable of being used to extract and separate the first and second content portions from a composite video content, each of the first and second content portions comprising multiple frames of video;
appending the second content portion to the end of one flame of the first content portion, overlapping at least one flame of the first content portion with at least one frame, but less than all the frames, of the second content portion comprising multiple frames to produce a composite video content, the overlapping including using a mixing function to combine at least one entire flame of the first portion with at least one entire flame of the second portion to cause distortion to occur when the overlapping frames are played;
encoding and transmitting the reference flame and information required for separating the second content portion from the first content portion out-of-band via a media track separate from the composite video content to a client device, the information including information on the mixing function; and encoding and transmitting the composite video content to the client device for removal of the distortion and separation of the second content portion from the first content portion using the reference flame and the information.

2. The method of claim 1, wherein the client device uses the reference flame to at least reduce the distortion by extracting and separating the first and second content portions from the composite video content an effect of the overlapping.

3. The method of claim 1, further comprising utilizing a mixing function to overlap the at least one frame of the second content portion with the at least one frame of the first content portion.

4. The method of claim 3, further comprising communicating metadata to the client device to identify an inverse mixing function, the client device utilizing the inverse function to reduce the effect of the overlapping.

5. The method of claim 3, wherein the mixing function comprises a weighting function, a progressive weighting function, a fade-in or a fade-out function.

6. The method of claim 3, wherein a post-mixing function increases the size of the group of picture (GOP) of the first and second content portions to increase a number of predicted P- or B-frames during the frame overlap.

7. The method of claim 1, further comprising:
identifying an insertion point in the first content portion; and overlapping a plurality of leading frames of the second content portion with a first set of frames adjacent the insertion point, and overlapping a plurality of trailing frames of the second content portion with a second set of frames adjacent the insertion point.

8. The method of claim 1, further comprising:
receiving the composite video content at the client device;
receiving the at least one reference frame; receiving metadata;
removing the effect of the overlapping from the composite video content using the at least one reference frame; and
rendering the first and second content portions to a display device.

9. The method of claim 1, further comprising sending the reference frames to the client device in-stream via a separate PID.

10. The method of claim 1, wherein the second content portion is advertisement content.

11. The method of claim 1, further comprising:
aligning timestamps of the first portion and the second content portion; and
rendering the first and second content portions separately to a display device.

12. The method of claim 11, wherein the client device displays the second content portion as separate content in a picture-in-picture format.

13. A method comprising:
receiving encoded composite video content;
decoding the encoded composite video content;
accessing the decoded composite video content including first and second content portions, wherein at least one frame of the first content portion is overlapped with at least one frame, but less than all the frames, of the second content portion and distortion appears where the first content portion is overlapped with the second content portion, the distortion caused by a mixing function used when the first content portion was overlapped with the at least one frame of the second content portion;
accessing at least one reference frame of the first or second content portion prior to the overlapping via a media track separate from the encoded composite video content;
accessing the mixing function transmitted over an out-of-band media track separate from the encoded composite video content; and
processing the at least one overlapping frame in the composite video content utilizing the reference frame and mixing function to separate the first content portion and the second content portion and reduce the distortion.

14. The method of claim 13, further comprising receiving metadata to identify a de-mixing function to remove the effect of the overlapping on the first and second conten portions.

15. The method of claim 14, further comprising:
identifying a plurality of leading flames of the second content portion;
utilizing a plurality of reference flames to remove the effect of the overlapping in the leading flames;
identifying a plurality of trailing flames of the second content portion; and
utilizing a plurality of reference flames to remove the effect of the overlapping in the trailing flames.

16. The method of claim 13, further comprising receiving the at least one reference flame in-stream via a separate PID.

17. The method of claim 13, wherein the second content portion is advertisement content.

18. The method of claim 13, further comprising:
aligning timestamps of the first content portion and the second content portion; and
rendering the first and second content portions separately to a display device.

19. The method of claim 13, wherein the client device displays the second content portion as separate content in a picture-in-picture format.

20. An apparatus comprising:
a communication module configured to:
receive encoded composite video content;
decode the encoded composite video content;
receive the decoded composite video content including first and second content portions, wherein at least one flame of the first content portion is overlapped with at least one frame, but less than all the frames, of the second content portion and distortion appears where the first content portion is overlapped with the second content portion, the distortion caused by a mixing function used when the first content portion was overlapped with the at least one frame of the second content portion; and
receive at least one reference frame of the first or second content portion prior to the overlapping and receive the mixing function via a media track separate from the encoded composite video content; and
a processing module to process the at least one overlapping frame in the composite video content utilizing the reference frame and mixing function to separate the first content portion and the second content portion and reduce the distortion.

21. The apparatus of claim 20, wherein the communication module is configured to receive metadata to identify a de-mixing function to remove the effect of the overlapping on the first and second content portions.

22. The apparatus of claim 20, wherein the processing module is configured to:
identify a plurality of leading frames of the second content portion;

utilize a plurality of reference frames to remove the effect of the overlapping in the leading frames;
identify a plurality of trailing frames of the second content portion; and
utilize a plurality of reference frames to remove the effect of the overlapping in the trailing frames.

23. The apparatus of claim 20, wherein the at least one reference frame is received in-stream via a separate PID.

24. The apparatus of claim 20, wherein the processing module is configured to align timestamps of the first portion and the second content portion, the apparatus further comprising a display module to render the first and second content portions separately to a display device.

25. An apparatus comprising:
a mixing module configured to:
overlap at least one frame of a first content portion comprising multiple frames of video with at least one frame, but less than all the frames, of a second content portion comprising multiple frames of video to produce a composite video content, the overlapping including using a mixing function to combine at least one entire flame of the first portion with at least one entire flame of the second portion to cause distortion to occur when the overlapping frames are played; and
designate at least one reference flame comprising a flame of the first or second content portion prior to the overlapping; and
a communication module to encode and transmit the reference flame and information required for separating the second content portion from the first content portion out-of-band via a separate media track to a client device, to encode and transmit the composite video content to the client device for removal of the distortion and separation of the second content portion from the first content portion using the reference flame and the information, the information including the mixing function.

26. The apparatus of claim 25, wherein the client device uses the reference frame to at least reduce an effect of the overlapping.

27. The apparatus of claim 26, wherein a mixing function is used to overlap the at least one frame of the second content portion with the at least one frame of the first content portion.

\* \* \* \* \*